Sept. 3, 1940. J. F. SKOLD 2,213,721
APPARATUS FOR SLITTING RUBBER ARTICLES
Filed Oct. 26, 1939 2 Sheets-Sheet 1

Sept. 3, 1940.  J. F. SKOLD  2,213,721
APPARATUS FOR SLITTING RUBBER ARTICLES
Filed Oct. 26, 1939  2 Sheets-Sheet 2

Inventor:
John F. Skold
By: Freeman, Sweet, Albrecht & Wiedeman
Attys.

Patented Sept. 3, 1940

2,213,721

UNITED STATES PATENT OFFICE 2,213,721

APPARATUS FOR SLITTING RUBBER ARTICLES

John F. Skold, Chicago, Ill., assignor to Charles E. Zimmerman, Chicago, Ill.

Application October 26, 1939, Serial No. 301,343

13 Claims. (Cl. 164—60)

This invention relates to the formation of pocket forming slits in rubber articles such as compacts or powder puffs.

The purpose or object of the invention is to provide a new and improved apparatus for cutting in an elastic or rubber article a pocket forming slit having a restricted entrance or opening and, more particularly, to provide an apparatus for cutting a slit or powder cavity in an automatic compact or powder puff of the type shown in Zimmerman Patent No. 2,176,831, issued October 17, 1939 (now Reissue Patent No. 21,399, dated March 12, 1940).

Other objects and advantages will be apparent from the following description given in connection with the drawings in which.

Figure 1:
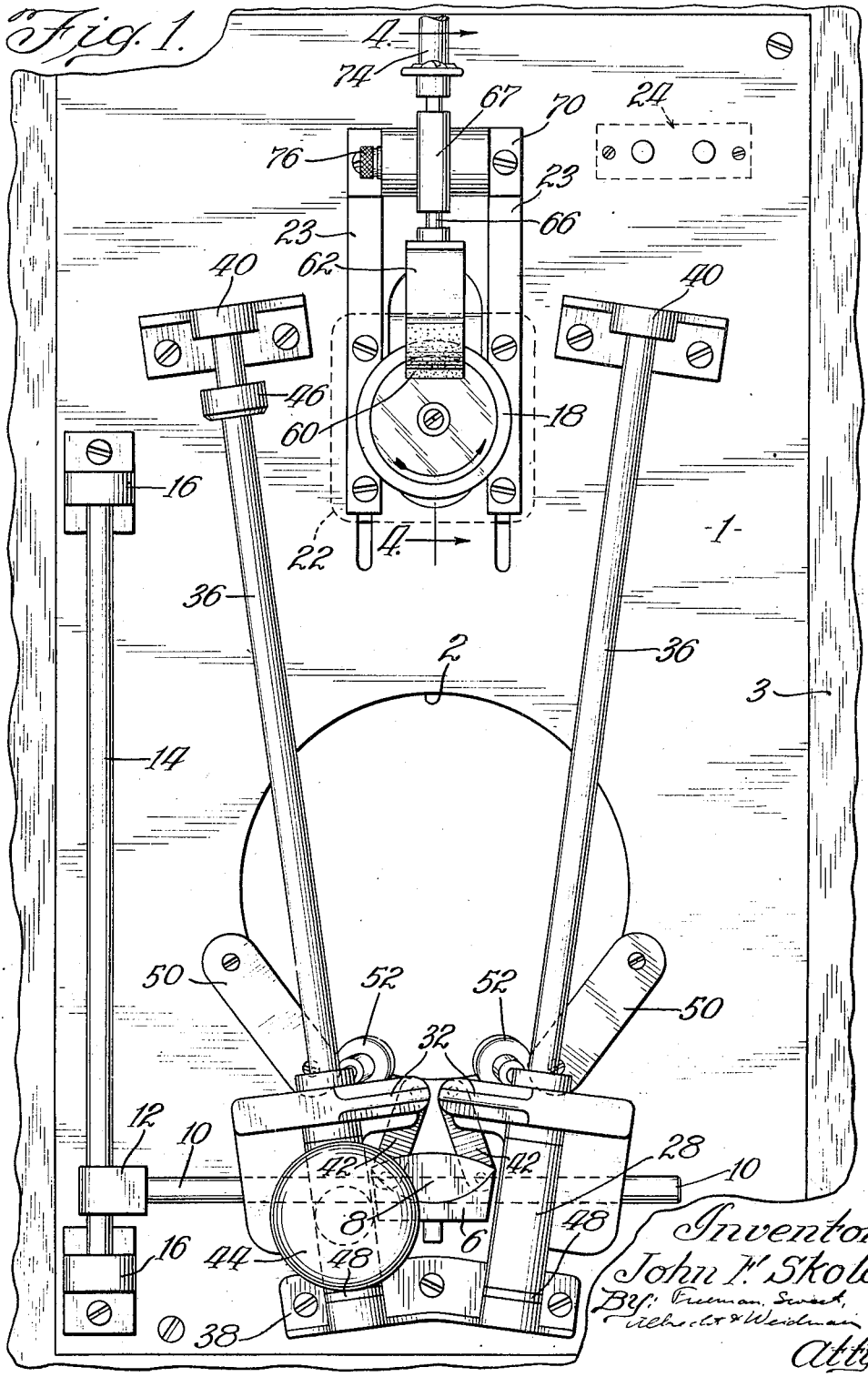
Figure 1 is a plan view of an apparatus embodying the invention, illustrating the parts in normal position.
Figure 2:
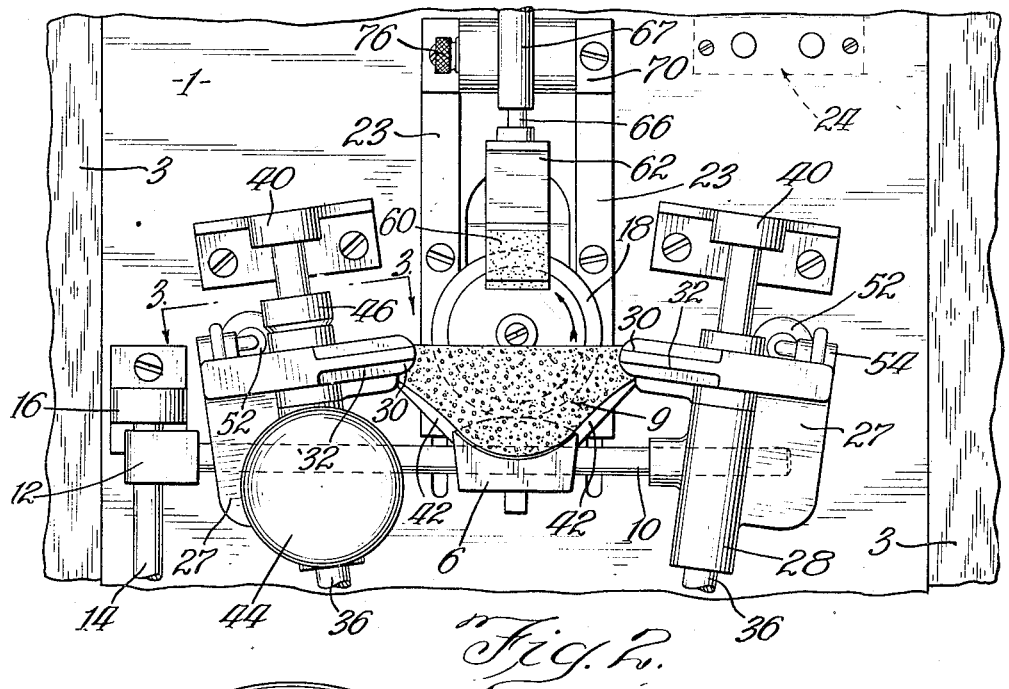
Figure 2 is a partial plan view illustrating the parts in cutting position.

In the manufacture of certain articles such, for example, as automatic compacts formed of "Airfoam" rubber, it is necessary to form an interior slit or pocket to provide a powder cavity which is just slightly smaller than the compact itself but which has a substantially restricted opening or entrance through the peripheral portion of the compact.

In accordance with this invention the cavity is formed by stretching a portion of the periphery of the article to be slit to permit the entry of a cutting knife, to cut a kerf or slit of the desired size; inserting a knife into the article and withdrawing the knife while said portion of the periphery is stretched; and then releasing the article and permitting it to resume its normal shape. This produces an interior slit of substantially the size of the cutter because the major portion of the article was not stretched, which slit is accessible through an opening in the peripheral portion of the article. The opening is materially restricted or materially smaller than the cutter due to the fact that the peripheral portion was stretched to an abnormal condition when the cut was made and was released to normal position after the cut was made.

The apparatus which is shown in the drawings is for carrying out the above method and is designed particularly for operating upon circular compacts. However, it will readily be understood that the size, shape, and use of the article prepared is immaterial so far as this invention is concerned.

The apparatus includes a rectangular horizontally extending base plate 1 having an opening 2 near its forward end through which the completed articles may be discharged or ejected. The plate may be supported upon any suitable means such as a stand, bench, or table top 3. Adjacent the opening 2 in the base plate is mounted the mechanism for supporting and stretching the compact while presenting it to the cutter or knife. This mechanism comprises an article or compact support in the form of a body 6 having an integral projecting arcuate platform 8 for receiving and supporting a compact 9. The body 6 is slidably mounted on a horizontally disposed guide rod 10 projecting from a slide 12 slidably mounted on a second horizontal guide rod 14 extending perpendicularly or at right angles to rod 10 and supported in end brackets 16 secured to the top of the base plate 1 adjacent the left edge thereof. Body 6 is accordingly mounted for horizontal movement over the top of plate 1 toward and from a rotary cutting knife 18 positioned above the plate 1 adjacent its rear end and carried upon the upper end of a motor shaft 20 of a motor 22 positioned beneath the plate 1 and secured thereto by means of bars 23 adjustably secured to the rear of plate 1 over slots therein. The knife is preferably of a size slightly smaller than the diameter of the compact so as to cut a slit 19 therein substantially the full size of the compact. It will be understood of course that the size of the knife may be varied in accordance with the size of the compact and size of slit or kerf to be made in the compact. Operation of the motor and knife may be controlled in the usual manner by a switch 24.

In order to stretch that portion of the periphery of the compact which is presented to the cutter and thus obtain a restricted opening 25 for the slit 19, the rear portion of the periphery of the compact is supported and held by two pairs of grippers which engage the periphery of the compact at closely adjacent but spaced points and stretch the portion therebetween. More specifically, each pair of grippers for gripping the periphery of the compact comprises a lower relatively fixed gripping portion 26 (Figure 3) formed upon the end of an arm 27 integral with sleeve 28, and an upper gripping portion 30 formed on a lever 32 pivoted intermediate its ends at 34 to the sleeve 28. Lever 32 is urged towards the lower portion 26 into gripping position by a compression spring 35 (Figure 3) which seats in a socket formed in the outer end of lever 32 and a socket formed in projecting portions of the sleeve 28. As previously stated there are two such pairs of grippers, namely, a right and left pair, for engaging the periphery of the compact at spaced points and stretching that portion of the compact held therebetween. Accordingly, one of the sleeves 28 and its gripper is slidingly mounted upon each of a pair of horizontal diverging guide rails 36 supported upon the top of plate 1 by a common forward bracket 38 and rear brackets 40. These rails 36 diverge as they extend toward the cutter 18, thus causing the two pairs of grippers to be separated as they are moved toward the cutter.

Sleeves 28 are connected to the body 6 by two links 42 each of which is pivoted at one end to a sleeve 28 and at its other end to the body 6. These links may be varied in length in accordance with the size cutter used, and cause the body 6 and platform 8 to move toward and from the cutter with the sleeves 28 and grippers 26—30 and prevent rotation of body 6 about rod 10.

To facilitate movement of the compact support toward and from the cutter, an operating handle 44 is secured to the left sleeve or slide 28 whereby an operator may readily move the compact into and out of engagement with the knife. Movement of the body 6 and sleeves 28 toward the knife is limited by a stop 46 (Figure 1) secured to the left rail 36, whereas movement of the body and slides away from the cutter to normal position is limited by the bracket 38 and cushioned by rubber bumpers 48.

From the foregoing it follows that as the sleeves 28 and body 6 are moved rearwardly along the rails 36 to present the compact to the cutting knife, the sleeves will slide outwardly on shaft 10 due to the divergence of the rails 36 and stretch that portion of periphery of the compact held between the grippers sufficiently to permit the entry of the rotary knife therebetween into the compact to cut an internal slit therein. The amount of stretch will of course be determined by the divergence of the rails 36 as necessitated by the size of the cutter.

In order that the apparatus may be automatic in its operation, means are provided for automatically releasing the grippers when the compact support is moved away from the knife to normal position. For this reason, inclined cam blocks 50 (Figure 1) are mounted upon the upper surface of the plate 1 in position to engage rollers 52 carried by Z-shaped arms 54 (Figure 3) projecting downwardly from the inner ends of gripper levers 32. As the body 6 and sleeves 28 are moved away from the cutter, rollers 52 engage the inclined cams 50, rock the levers 32 against the action of springs 35, and open the gripper portions 26 and 30, which releases the compact. The cams and rollers are so positioned that when the support is in its fully retracted position away from the cutter, the rollers 52 will have been moved beyond their centers, and accordingly the grippers will be retained in open or inoperative position. As sleeves 28 and body 6 are moved toward the knife, the rollers 52 move along the inclined cams and permit the springs 35 to close the grippers, whereby the compact is immediately gripped after which the stretching action takes place.

Figures 3, 4, 5:
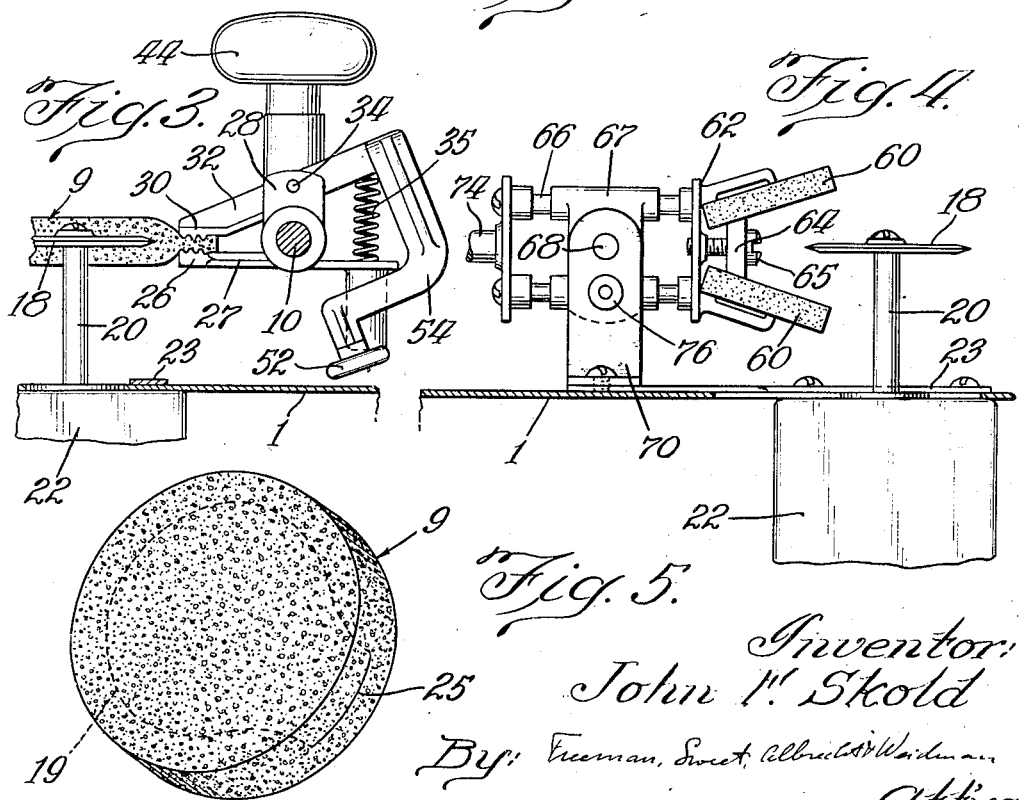
Figure 3 is a fragmentary section taken on line 3—3 of Figure 2.
Figure 4 is a side elevation of the cutter-sharpening mechanism.
Figure 5 is a perspective of a compact which has been slit by the apparatus.

To facilitate sharpening of the cutter there is provided a sharpening device comprising a pair of abrasive stones 60 disposed angularly to each other upon a head 62, and held thereon by a wedge block 64 and a screw 65 as clearly shown in Figure 4. The head 62 is secured to the ends of a pair of parallel rods 66 slidably mounted in a block 67 pivoted at 68 to a bracket 70 attached to the plates 23 and thereby adjustably secured on the upper surface of plate 1. For ready manipulation of the stones a handle 74 (Figure 1) is attached to the rear ends of rods 66 to rotate the latter to cause either the upper or lower stone 60 to be rocked into engagement with the cutter after first loosening the thumb screw 76 which extends through the bracket 70 and into the block 67, thus normally preventing rocking of the latter.

It is believed that the operation of the apparatus described and the method employed thereby will be apparent from the foregoing, but for the sake of clearness, a single operation will briefly be described.

The operator places a compact 9 upon the supporting platform 8 and between the pairs of open grippers 26 and 30, grasps the handle 44, and moves the support 6 and sleeves 28 toward the cutter 18. In so doing, the rollers 52 ride along the inclined surfaces of the cams 50 and permit the jaws or grippers 26 and 30 to clamp the peripheral portion of the compact therebetween. As the support and sleeves are moved further toward the cutter, the diverging rails 36 cause the grippers to be moved outwardly, thereby stretching that portion of the periphery of the compact held therebetween a distance sufficient to permit the entry of the cutter into the compact. After the support has been moved into engagement with the cutter as far as permitted by stop 46, thereby cutting a kerf or slit 19 (Figure 5) therein, the operator returns the support and sleeves to normal or retracted position. In so doing, the compact is returned to initial starting position—that is, the grippers return to normal open position, and the compact assumes its original shape as shown in Figure 5, and may be dropped through the opening 2 into a suitable receptacle. After the compact has returned to normal shape the opening 25 to the interior slit 19 assumes a restricted size, whereas the slit itself is of a size almost equal to the diameter of the cutter due to the fact that only the peripheral portion of the compact was materially stretched as the compact was presented to the cutter.

It will be obvious from the foregoing that the apparatus described may be constructed to take various sizes and shapes of elastic articles by changing the shape and size of the platform 8, the angularity of the rails 36, the links 42, and the size of cutter.

Without further elaboration the foregoing will so fully describe my invention that others may, by applying knowledge current at the time of application, readily adapt the same for use under various conditions of service.

I claim:

1. In an apparatus for slitting elastic articles to provide an internal kerf with a restricted opening therein, the combination of a cutting knife; a support for the article to be slit, said support and knife being movable toward and from each other; means for gripping said article at spaced points along its periphery; means for separating said gripping means to stretch a portion of the periphery of said article therebetween to permit the entry of the knife into said article;

and means for moving the support and knife toward each other while said article is stretched to cause said knife to enter the article through the stretched portion.

2. An apparatus for slitting elastic articles to provide an internal kerf with a restricted opening therein, comprising in combination a cutting knife; a support for the article to be slit, said support and knife being movable toward and from each other; means for moving said knife and support toward each other to bring the knife into engagement with the article on said support; and means associated with the support for progressively stretching a portion of the periphery of the article during movement of said knife and support toward each other, whereby said article will be cut while stretched.

3. An apparatus for slitting elastic articles to provide an internal kerf with a restricted opening therein, comprising in combination a cutting knife; a support for the article to be slit, said support and knife being movable toward and from each other; means for moving said knife and support toward each other to bring the knife into engagement with the article on said support; means for gripping said article at spaced points along its periphery; and means for separating said gripping means to stretch a portion of the periphery of said article therebetween to permit the entry of a knife into said article, as said knife and support are moved toward each other.

4. In an apparatus for slitting elastic articles to provide an internal kerf with a restricted opening therein, the combination of a cutting knife; a support for the article to be slit, said knife and support being movable toward and from each other; means for moving said knife and support toward each other to bring the article therein into cutting engagement with said knife; grippers for gripping the periphery of said article at spaced points; and means for releasing said grippers as said knife and support are moved away from each other and for permitting said grippers to grip said article as said knife and support move toward each other.

5. In an apparatus for slitting elastic articles to provide an internal kerf with a restricted opening therein, the combination of a cutting knife; a support for the article to be slit, said knife and support being movable toward and from each other; means for moving said knife and support toward each other to bring the article therein into cutting engagement with said knife; grippers for gripping the periphery of said article at spaced points; means for releasing said grippers as said knife and support are moved away from each other and for permitting said grippers to grip said article as said knife and support move toward each other; and means for separating said gripping means to stretch the periphery of the article therebetween to permit entry of the knife between said grippers and into said article to cut a kerf therein.

6. In an apparatus for slitting elastic articles to provide an internal kerf with a restricted opening therein, the combination of a cutting knife; a support for the article to be slit movable toward and from said knife; means for moving said support toward said knife to bring the knife into cutting engagement with the article on said support; grippers on said support for gripping the periphery of said article at spaced points; means for releasing said grippers as said support is moved away from said knife, and for permitting said grippers to grip said article as said support moves toward said knife; and means for separating said gripping means to stretch the periphery of the article therebetween as said support moves toward said knife to permit entry of the knife into said article to cut a kerf therein.

7. In an apparatus for slitting elastic articles to provide an internal kerf with a restricted opening therein, the combination of a rotary knife; a support for the article to be slit, movable toward and from said knife; means for guiding said support to and from said knife; means for moving said support toward said knife to cause said knife to engage the article therein; operating means on said support for gripping the periphery of the article thereon; means for releasing said gripping means as said support is moved away from said cutter; and means for separating said grippers to stretch the article thereon as said support is moved toward said cutter.

8. In an apparatus for slitting elastic articles to provide an internal kerf with a restricted opening therein, the combination of a rotary knife; a support for the article to be slit, movable toward and from said knife; means for guiding said support to and from said knife; means for moving said support toward said knife to cause said knife to engage the article thereon; normally closed pairs of pivoted grippers on said support for gripping the periphery of the article thereon at different points; means for releasing said grippers as said support is moved away from said cutter; and means for separating said pairs of grippers to stretch the article thereon as said support is moved toward said cutter.

9. In an apparatus for slitting elastic articles to provide an internal kerf with a restricted opening therein, the combination of a rotary knife; a support for the article to be slit, movable toward and from said knife; means for guiding said support to and from said knife; means for moving said support toward said knife to cause said knife to engage the article thereon; pairs of spring closed pivoted grippers on said support for gripping different parts of the periphery of the article thereon; cams for releasing said grippers as said support is moved away from said cutter; and means for separating the pairs of grippers to stretch the article thereon as said support is moved toward said cutter.

10. In an apparatus for slitting elastic articles to provide an internal kerf with a restricted opening therein, the combination of a rotary knife; a support for the article to be slit, movable toward and from said knife; means for guiding said support to and from said knife; means for moving said support toward said knife to cause said knife to engage the article thereon; pairs of spring closed pivoted grippers on said support for gripping different parts of the periphery of the article thereon; cams for releasing said grippers as said support is moved away from said cutter; and diverging guides for separating said pairs of grippers to stretch the article thereon as said support is moved toward said cutter.

11. In an apparatus for slitting elastic articles to provide an internal kerf with a restricted opening therein, the combination of a base plate having a discharge opening therein; a rotary knife; a support positioned normally adjacent said discharge opening and movable toward and from said knife; means for guiding said support to and from said knife; means for moving said support toward said knife to cause said knife to engage the article thereon; spring closed pairs of pivoted grippers on said support for gripping different parts of the periphery of the article thereon; cams for releasing said grippers as said support is moved away from said knife; and diverging guides for separating said pairs of grippers to stretch the article thereon as said support is moved toward said cutter knife.

12. In an apparatus for slitting elastic articles to provide an internal kerf with a restricted opening therein, the combination of a rotary knife; a support for the article to be slit, movable toward and from said knife; means for guiding said support to and from said knife; means for moving said support toward said knife to cause said knife to engage the article thereon; pivoted grippers on said support for gripping the periphery of the article thereon; cams for releasing said grippers as said support is moved away from said cutter; diverging guides for separating said grippers to stretch the article thereon as said support is moved toward said cutter; and a linkage between said grippers and said support for keeping said support equidistant from said grippers as they separate and move together again.

13. In an apparatus of the character described, the combination of a support member having associated therewith opposed pairs of grippers for gripping and stretching an elastic article, a rotary-disc type knife member, and means whereby one of the members may be moved towards the other member in order to bring the knife member into penetrating relation with the stretched article for slit forming purposes.

JOHN F. SKOLD.